US010036263B2

(12) United States Patent
Lyders

(10) Patent No.: US 10,036,263 B2
(45) Date of Patent: Jul. 31, 2018

(54) STATOR ASSEMBLY WITH PAD INTERFACE FOR A GAS TURBINE ENGINE

(71) Applicant: UNITED TECHNOLOGIES CORPORATION, Hartford, CT (US)

(72) Inventor: David R Lyders, Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 343 days.

(21) Appl. No.: 14/829,774

(22) Filed: Aug. 19, 2015

(65) Prior Publication Data

US 2016/0115800 A1 Apr. 28, 2016

Related U.S. Application Data

(60) Provisional application No. 62/066,998, filed on Oct. 22, 2014.

(51) Int. Cl.
*F01D 9/02* (2006.01)
*F01D 25/28* (2006.01)
*F01D 9/04* (2006.01)

(52) U.S. Cl.
CPC ............. *F01D 9/02* (2013.01); *F01D 9/04* (2013.01); *F01D 25/28* (2013.01); *F05D 2220/323* (2013.01); *F05D 2260/941* (2013.01); *F05D 2300/43* (2013.01); *F05D 2300/501* (2013.01); *F05D 2300/50212* (2013.01); *Y02T 50/672* (2013.01)

(58) Field of Classification Search
CPC ... F01D 9/02; F01D 9/04; F01D 25/28; F05D 2300/50212; F05D 2300/501; F05D 2260/941; F05D 2300/43; F05D 2220/323
See application file for complete search history.

(56) References Cited

U.S. PATENT DOCUMENTS

| 3,275,294 | A | * | 9/1966 | Allen ..................... F01D 5/081 |
| | | | | 415/115 |
| 4,238,170 | A | | 12/1980 | Robideau et al. |
| 4,274,805 | A | | 6/1981 | Holmes |
| 4,395,195 | A | | 7/1983 | De Cosmo et al. |
| 4,422,827 | A | * | 12/1983 | Buxe ..................... F01D 11/001 |
| | | | | 415/173.7 |
| 5,282,718 | A | | 2/1994 | Koff et al. |
| 5,308,225 | A | | 5/1994 | Koff et al. |
| 5,482,433 | A | * | 1/1996 | Norris ...................... F01D 5/22 |
| | | | | 415/173.7 |

(Continued)

FOREIGN PATENT DOCUMENTS

| EP | 0 654 586 | 5/1995 |
| EP | 1 840 337 | 10/2007 |
| EP | 2 781 697 | 9/2014 |

OTHER PUBLICATIONS

European search report for Application No. 15182076.8-1610 dated Apr. 14, 2016.

*Primary Examiner* — Eldon Brockman
(74) *Attorney, Agent, or Firm* — Bachman & LaPointe, P.C.

(57) ABSTRACT

An inner platform structure of a stator vane for a gas turbine engine includes a male circumferential side opposite a female circumferential side, the male circumferential side includes a male wall received at least partially within a female wall of a neighboring stator vane at an interface with a pad at the interface.

15 Claims, 4 Drawing Sheets

(56) References Cited

U.S. PATENT DOCUMENTS

| | | |
|---|---|---|
| 5,562,404 A | 10/1996 | Koff et al. |
| 5,950,308 A | 9/1999 | Koff et al. |
| 7,195,453 B2 | 3/2007 | Martin et al. |
| 7,229,247 B2 | 6/2007 | Durocher et al. |
| 7,229,249 B2 | 6/2007 | Durocher et al. |
| 7,241,108 B2 | 7/2007 | Lewis |
| 7,246,994 B2 | 7/2007 | Lewis |
| 7,407,369 B2 | 8/2008 | Schwarz et al. |
| 7,909,570 B2 | 3/2011 | Durocher et al. |
| 8,011,883 B2 | 9/2011 | Schwarz et al. |
| 8,038,388 B2 | 10/2011 | Freling et al. |
| 8,186,933 B2 | 5/2012 | Doss et al. |
| 2006/0245715 A1 | 11/2006 | Matsumoto et al. |
| 2016/0017716 A1 | 1/2016 | Haggmark et al. |

\* cited by examiner

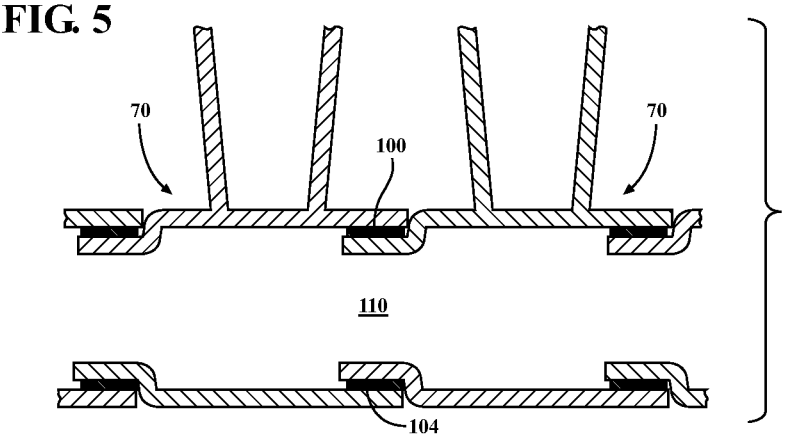
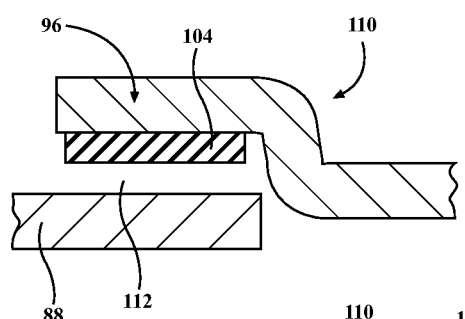
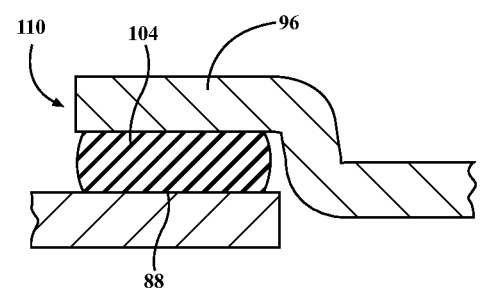

STATOR ASSEMBLY WITH PAD INTERFACE FOR A GAS TURBINE ENGINE

CROSS REFERENCE TO RELATED APPLICATION

This application claims the benefit of provisional application Ser. No. 62/066,998, filed Oct. 22, 2014.

STATEMENT REGARDING FEDERALLY SPONSORED RESEARCH OR DEVELOPMENT

This disclosure was made with Government support under N00019-02-C-3003 awarded by The United States Navy. The Government has certain rights in this disclosure.

BACKGROUND

The present disclosure relates to components for a gas turbine engine and, more particularly, to a vane ring assembly therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The compressor section includes a case circumscribing an engine axis with axially alternating vane rings and rotor disks. Each vane ring may be constructed of multiple vane clusters distributed circumferentially about the interior of the case. One type of vane cluster utilizes a stator two-pack (doublet), with an outer platform structure and an inner box structure. The inner box structure of neighboring stator two-packs nest together during assembly utilizing a swage joint. Due to tolerances and gapping required to permit assembly, this swage joint may have some "play" such that each stator may locally deflect before the swage joint cross-corners engage during engine operation.

SUMMARY

An inner platform structure of a stator vane for a gas turbine engine, the inner platform structure according to one disclosed non-limiting embodiment of the present disclosure includes a female circumferential side. A male circumferential side is opposite the female circumferential side, and includes at least one male wall received at least partially within at least one female wall of a neighboring stator vane at an interface. A pad located at the interface.

A further embodiment of the present disclosure includes, wherein the pad is located on the at least one male wall.

A further embodiment of any of the foregoing embodiments of the present disclosure includes, wherein the pad is located on each of a multiple of male walls.

A further embodiment of any of the foregoing embodiments of the present disclosure includes, wherein the pad is located on the at least one female walls.

A further embodiment of any of the foregoing embodiments of the present disclosure includes, wherein the pad is located on each of a multiple of female walls.

A further embodiment of any of the foregoing embodiments of the present disclosure includes, wherein the pad is manufactured of an elastomeric material.

A further embodiment of any of the foregoing embodiments of the present disclosure includes, wherein the pad expands in response to a change in temperature.

A further embodiment of any of the foregoing embodiments of the present disclosure includes, wherein the male circumferential side and the female circumferential side form a portion of a box structure.

A further embodiment of any of the foregoing embodiments of the present disclosure includes, wherein the male circumferential side corresponds to the female circumferential side.

A further embodiment of any of the foregoing embodiments of the present disclosure includes wherein the male circumferential side and the female circumferential side form a portion of a box structure of an inner platform structure.

A further embodiment of any of the foregoing embodiments of the present disclosure includes, wherein the male circumferential side and the female circumferential side form a portion of a box structure of the inner platform structure.

A stator vane for a gas turbine engine according to another disclosed non-limiting embodiment of the present disclosure includes an airfoil between an outer platform structure and an inner platform structure, the inner platform structure includes a female circumferential side and a male circumferential side that forms a portion of a box structure, the male circumferential side includes a multiple of male walls that are received at least partially within at least one female wall of a neighboring stator vane at an interface and a pad at the interface.

A further embodiment of any of the foregoing embodiments of the present disclosure includes, wherein the pad is located on at least one of the multiple of male walls.

A further embodiment of any of the foregoing embodiments of the present disclosure includes, wherein the pad is located on at least one of the multiple of female walls.

A further embodiment of any of the foregoing embodiments of the present disclosure includes, wherein the pad is manufactured of an elastomeric material.

A stationary vane ring assembly according to one disclosed non-limiting embodiment of the present disclosure includes a first stator vane inner platform structure, the first stator vane inner platform structure including a female circumferential side and a male circumferential side that forms a portion of a box structure; a second stator vane inner platform structure, the second stator vane inner platform structure including a female circumferential side and a male circumferential side that forms a portion of a box structure, the second inner platform structure nests at least partially within the first stator vane inner platform structure at an interface; and a multiple of pads at the interface.

A further embodiment of any of the foregoing embodiments of the present disclosure includes, wherein each of the multiple of pads form a respective gap at a nominal temperature.

A further embodiment of any of the foregoing embodiments of the present disclosure includes, wherein each of the multiple of gaps are closed at an engine operating temperature.

A further embodiment of any of the foregoing embodiments of the present disclosure includes, wherein the multiple of pads are manufactured of an elastomeric material.

A further embodiment of any of the foregoing embodiments of the present disclosure includes, wherein each of the multiple of pads are located on at least one of a male wall and a female wall at the interface.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 5 is a cross-sectional view of an interface between neighboring inner platform structures according to one disclosed non-limiting embodiment;

FIG. 6 is an expanded cross-sectional view of one pad interface space between neighboring inner platform structures in a first condition; and FIG. 7 is an expanded cross-sectional view of the interface of FIG. 6 in a second condition.

DETAILED DESCRIPTION

Figure 1:
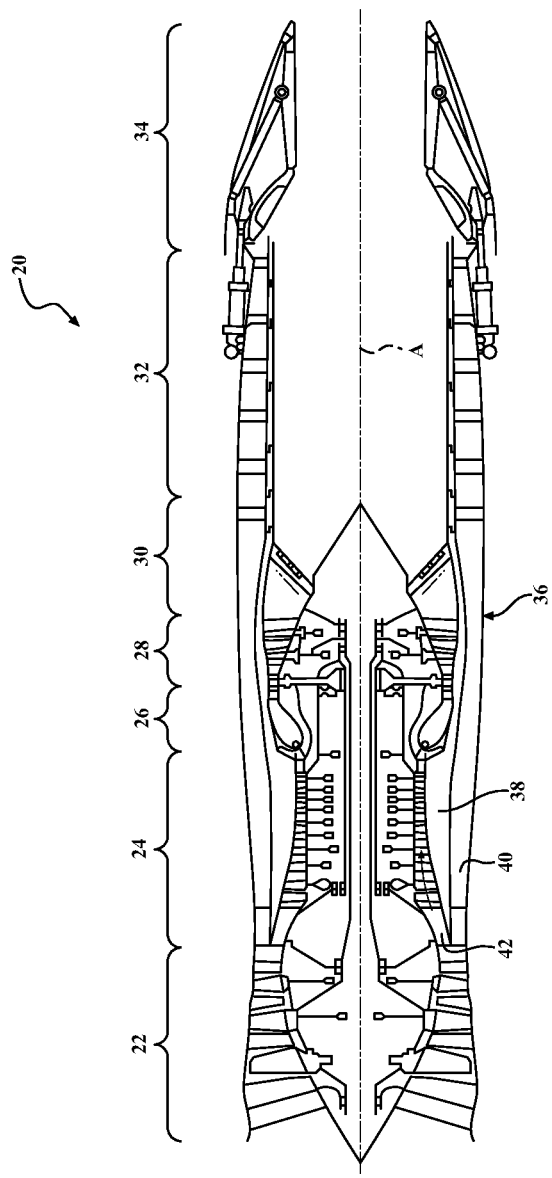
FIG. 1 is a schematic cross-section of an example gas turbine engine architecture.

FIG. 1 schematically illustrates a gas turbine engine 20. The gas turbine engine 20 is disclosed herein as a two-spool, low-bypass, augmented turbofan that generally incorporates a fan section 22, a compressor section 24, a combustor section 26, a turbine section 28, an augmenter section 30, a duct section 32, and a nozzle system 34 along a central longitudinal engine axis A. Although depicted as an augmented low bypass turbofan in the disclosed non-limiting embodiment, it should be appreciated that the concepts described herein are applicable to other gas turbine engines including non-augmented engines, geared architecture engines, direct drive turbofans, turbojet, turboshaft, multi-stream variable cycle, and other engine architectures.

An outer case structure 36 and an inner case structure 38 define a generally annular secondary airflow path 40 around a core airflow path 42. Various structures may define the outer case structure 36 and the inner case structure 38 which essentially define an exoskeleton to support rotational hardware therein. Air that enters the fan section 22 is divided between core airflow through the core airflow path 42, and secondary airflow through the secondary airflow path 40. The core airflow passes through the combustor section 26, the turbine section 28, then the augmentor section 30, where fuel may be selectively injected and burned to generate additional thrust through the nozzle system 34.

The secondary airflow may be utilized for a multiple of purposes to include, for example, cooling, pressurization and variable cycle operations. The secondary airflow as defined herein is any airflow different from the core airflow. The secondary airflow may ultimately be at least partially injected into the core airflow path 42 adjacent to the duct section 32 and the nozzle system 34. It should be appreciated that additional airflow streams, such as a third stream airflow of variable cycle engine architectures, may additionally be provided.

Figure 2:
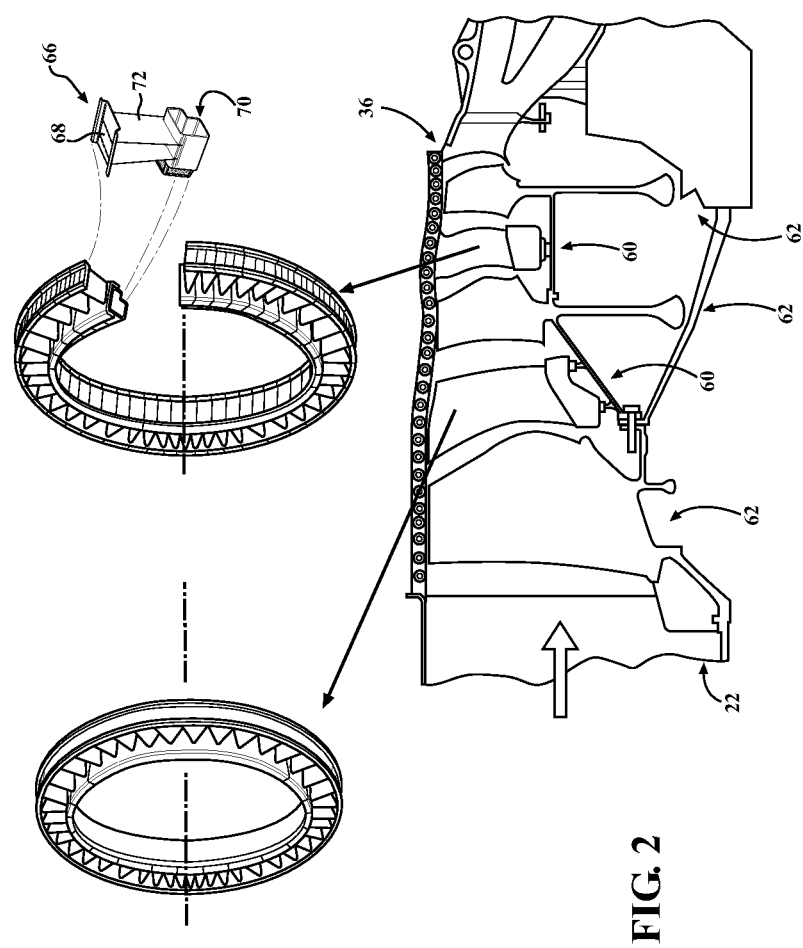
FIG. 2 is an enlarged schematic cross-section of an example engine fan section.

With reference to FIG. 2, an enlarged schematic view of a portion of the fan section 22 is shown by way of example; however, other engine sections will also benefit herefrom. The fan section includes a multiple of stages with sequentially alternate stationary vane ring assemblies 60, and rotational rotor assemblies 62, such as an integrally bladed rotors, along an airflow passage 64 that drives air along the core flowpath. Although the fan section 22 is illustrated in the disclosed non-limiting embodiment, other engine sections will also benefit herefrom. Moreover, although a particular number of stages are illustrated, it should be appreciated that any number of stages will benefit herefrom.

Figure 3:
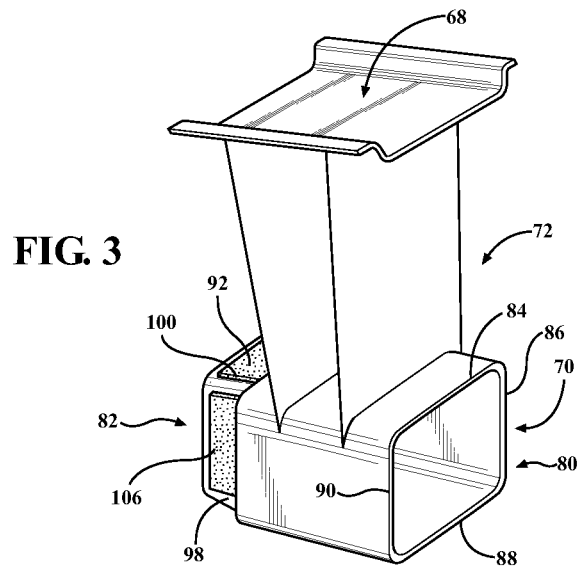
FIG. 3 is a female circumferential perspective view of a stator vane with an inner platform structure according to one disclosed non-limiting embodiment.

With reference to FIG. 3, each stationary vane ring assembly 60 (also shown in FIG. 4) includes a multiple of stator vanes 66. Each of the multiple of stator vanes 66 generally includes an outer platform structure 68, an inner platform structure 70 and one or more airfoils 72 (stator two-pack (two air foils) shown) therebetween. The outer platform structure 68 is mounted to the engine static structure 36 via, for example, segmented hooks or other interfaces. The multiple of outer platform structures 68 form a full ring outer boundary of the airflow passage 64, the multiple of stator vanes 66 extend toward the engine axis A through the airflow passage 64, and the multiple of inner platform structures 70 interact to form a full ring inner boundary of the airflow passage 64.

With reference to FIG. 3, in one disclosed non-limiting embodiment, the inner platform structure 70 is a box structure with a female circumferential side 80, and a male circumferential side 82. It should be appreciated that the box structure may be of various shapes such as rectilinear (FIGS. 3 and 4) and other shapes (FIG. 2). The female circumferential side 80, and the male circumferential side 82 correspond, such that the male circumferential side 82 interfaces at least partially within the female circumferential side 80 (FIG. 2).

Figure 4:
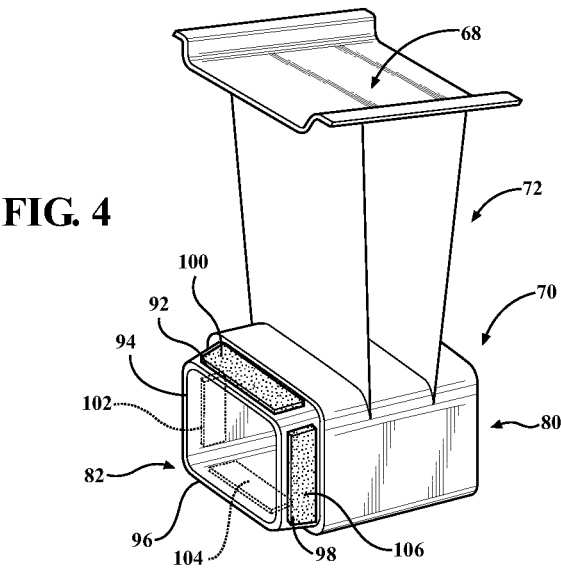
FIG. 4 is a male circumferential perspective view of a stator vanes with an inner platform structure according to one disclosed non-limiting embodiment.

In this disclosed non-limiting embodiment, the female circumferential side 80 includes a first female wall 84, a second female wall 86, a third female wall 88, and a fourth female wall 90, while the male circumferential side 82 includes a corresponding first male wall 92, a second male wall 94, a third male wall 96, and a fourth male wall 98 (FIG. 4). It should be appreciated that although the male walls 92, 94, 96, 98 and female walls 84, 86, 88, 90 are separately identified and are arranged in a generally rectilinear geometry in the illustrated example, other wall geometries such as generally circular, oval, triangular, and other cross-sectional shapes that has essentially one continuous wall around its circumference and other configurations will also benefit herefrom.

The male walls 92, 94, 96, 98 each includes a respective pad 100, 102, 104, 106. Each pad 100, 102, 104, 106 is formed of an elastomeric material to include, but not be limited to silicone rubber. Each pad 100, 102, 104, 106 may be formed as a coating, applique or other application to the substrate which is typically a nickel super alloy, ceramic matrix composite, or other relatively high temperature material appropriate to the particular engine section.

Each pad 100, 102, 104, 106 is respectively located on the outer male walls 92, 94, 96, 98 opposite the female walls 84, 86, 88, 90 (shown), the inner surface of the female walls 84, 86, 88, 90 opposite the outer male walls 92, 94, 96, 98, or both. The pads 100, 102, 104, 106 are thereby located between the respective male circumferential side 82 within the female circumferential side 80 to form a swage—type interface 110 (FIG. 5). That is, the pads 100, 102, 104, 106 are located at the interface 110 of the joint between each adjacent inner platform structure 70.

With reference to FIG. 6, at a nominal room temperature, the interface 110 provides a respective gap 112 between each pads 100, 102, 104, 106 and the opposed surface to facilitate assembly and disassembly of each adjacent inner platform structure 70. Once the engine 20 begins operation, and the temperature at the interface 110 increases, the pads 100, 102, 104, 106 expand due to their relatively larger coefficient of thermal expansion, and close the respective gaps 112 (FIG. 7). This stiffens the interface 110 and prevents relative motion in operation to facilitate the inner platform structure 70 of the each stationary vane ring assembly 60 to structurally function as a single full ring-like entity. That is, the pads 100, 102, 104, 106 expand to essentially "bond" the two mating faces, structurally stiffening the assembly. In one example, the operational temperature may be about 550 F (288 C).

At operating temperatures, when the gap 112 has been sealed due to the expanded pads 100, 102, 104, 106, potential leak passages for secondary flow through the inner box geometry of the inner platform structure 70 are closed, thereby further benefiting engine performance and efficiency. The pads 100, 102, 104, 106, also dampen engine vibrations at the inner box of the stationary vane ring assembly 60.

After the engine 20 is shut down and cools, the pads 100, 102, 104, 106 shrink, again facilitating ease of disassembly, and maintenance thereof.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. An inner platform structure of a stator vane for a gas turbine engine, the inner platform structure comprising:
    a female circumferential side that forms a portion of a female box structure having at least one female wall;
    a male circumferential side opposite said female circumferential side, said male circumferential side forms a portion of a male box structure having at least one male wall that is receivable at least partially within a female box structure of a neighboring stator vane at an interface; and
    a pad at said interface, said pad expands in response to an increase in temperature to an operational temperature above a nominal room temperature to close a gap at said interface at said nominal room temperature.

2. The inner platform structure as recited in claim 1, wherein said pad is located on said at least one male wall.

3. The inner platform structure as recited in claim 1, wherein said pad is located on each of a multiple of male walls.

4. The inner platform structure as recited in claim 1, wherein said pad is located on said at least one female wall.

5. The inner platform structure as recited in claim 1, wherein said pad is located on each of a multiple of female walls.

6. The inner platform structure as recited in claim 1, wherein said pad is manufactured of an elastomeric material.

7. The inner platform structure as recited in claim 1, wherein said operational temperature is 550 F (288 C).

8. The inner platform structure as recited in claim 1, wherein said male circumferential side corresponds to said female circumferential side.

9. A stator vane for a gas turbine engine, comprising:
    an airfoil between an outer platform structure and an inner platform structure, said inner platform structure includes a female circumferential side and a male circumferential side that forms a portion of a box structure, said male circumferential side includes a multiple of male walls that are received at least partially within at least one female wall of a neighboring stator vane at an interface; and
    a pad on each of either said multiple of male walls or said at least one female wall at said interface, wherein at a nominal room temperature, the interface provides a respective gap between said pad and an opposed wall surface, said pad expands in response to an increase in temperature above said nominal room temperature to close said gap.

10. The stator vane as recited in claim 9, wherein said pad is manufactured of an elastomeric material.

11. A stationary vane ring assembly, comprising:
    a first stator vane inner platform structure, said first stator vane inner platform structure including a first stator vane female circumferential side and a first stator vane male circumferential side that forms a portion of a first stator vane box structure;
    a second stator vane inner platform structure, said second stator vane inner platform structure including a second stator vane female circumferential side and a second stator vane male circumferential side that forms a portion of a second stator vane box structure, said second stator vane inner platform structure nests at least partially within said first stator vane inner platform structure at an interface between said first stator vane box structure and said second stator vane box structure, said first stator vane male circumferential side includes a multiple of male walls that are received at least partially with a multiple of female walls of a neighboring stator vane; and a multiple of pads at said interface, at least one pad of said multiple of pads on each of either said multiple of male walls or said multiple of female walls at said interface, wherein at a nominal room temperature, the interface provides a respective gap between said at least one pad and an opposed wall surface to permit disassembly, wherein said at least one pad expands in response to an increase in temperature above said nominal room temperature to close said gap.

12. The assembly as recited in claim 11, wherein said multiple of pads are manufactured of an elastomeric material.

13. The assembly as recited in claim 11, wherein each of said multiple of pads are located between a male wall and a female wall of said first stator vane box structure and said second stator vane box structure.

14. The assembly as recited in claim 13, wherein said first stator vane box structure comprises four male walls and said second stator vane box structure comprises four female walls, said male and female walls form said interface.

15. The inner platform structure as recited in claim 11, wherein said temperature above said nominal room temperature is an operational temperature of the gas turbine engine.

* * * * *